United States Patent
Wang et al.

(10) Patent No.: US 8,754,805 B2
(45) Date of Patent: Jun. 17, 2014

(54) METHOD AND APPARATUS FOR IMAGE-BASED POSITIONING

(75) Inventors: Sy Bor Wang, Palo Alto, CA (US); Hongbo Teng, Fremont, CA (US); Omar P. Soubra, Westminster, CO (US); Bruno M. Scherzinger, Richmond Hill (CA); Peter G. France, Christchurch (NZ); James M. Janky, Los Altos, CA (US); Gregory C. Best, Francisco, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 410 days.

(21) Appl. No.: 13/167,733

(22) Filed: Jun. 24, 2011

(65) Prior Publication Data

US 2012/0163656 A1  Jun. 28, 2012

Related U.S. Application Data

(60) Continuation-in-part of application No. 12/313,560, filed on Nov. 20, 2008, now Pat. No. 7,619,561, which is a division of application No. 11/303,676, filed on Dec. 15, 2005, now Pat. No. 7,541,974, application No. 13/167,733, which is a continuation-in-part of application No. 12/559,322, filed on Sep. 14, 2009, and a continuation-in-part of application No. 12/459,843, filed on Jul. 7, 2009, now Pat. No. 8,229,166.

(60) Provisional application No. 61/358,423, filed on Jun. 25, 2010.

(51) Int. Cl.
*G01S 13/00* (2006.01)

(52) U.S. Cl.
USPC .......................................................... 342/52

(58) Field of Classification Search
USPC ..................................................... 342/357.17
See application file for complete search history.

(56) References Cited

U.S. PATENT DOCUMENTS

| 5,642,285 A | 6/1997 | Woo |
| 6,147,598 A | 11/2000 | Murphy |

(Continued)

FOREIGN PATENT DOCUMENTS

| EP | 1931945 A2 | 6/2008 |
| EP | 1936323 A2 | 6/2008 |

(Continued)

OTHER PUBLICATIONS

Kohler et al. "TrackSense: Infrastructure Free Precise Indoor Positioning Using Projected Patterns", A. LaMarca et al. (Eds.): Pervasive 2007, LNCS 4480, pp. 334-350, Springer-Verlag Berlin Heidelberg, 2007.

(Continued)

*Primary Examiner* — Harry Liu
(74) *Attorney, Agent, or Firm* — Kilpatrick Townsend & Stockton LLP

(57) ABSTRACT

Method and apparatus are provided for image based positioning comprising capturing a first image with an image capturing device. Wherein said first image includes at least one object. Moving the platform and capturing a second image with the image capturing device. The second image including the at least one object. Capturing in the first image an image of a surface; capturing in the second image a second image of the surface. Processing the plurality of images of the object and the surface using a combined feature based process and surface tracking process to track the location of the surface. Finally, determining the location of the platform by processing the combined feature based process and surface based process.

30 Claims, 9 Drawing Sheets

(56) References Cited

U.S. PATENT DOCUMENTS

| | | |
|---|---|---|
| 6,282,362 B1 | 8/2001 | Murphy |
| 7,248,285 B2 | 7/2007 | Needham |
| 7,339,611 B2 | 3/2008 | Marold |
| 7,526,384 B2 | 4/2009 | MacIntosh et al. |
| 7,541,974 B2 | 6/2009 | Scherzinger |
| 7,619,561 B2 | 11/2009 | Scherzinger |
| 7,650,013 B2 | 1/2010 | Dietsch et al. |
| 7,697,127 B2 | 4/2010 | Vogel |
| 7,719,467 B2 * | 5/2010 | Norda et al. ............ 342/357.31 |
| 2003/0083804 A1 | 5/2003 | Pilley et al. |
| 2004/0168148 A1 * | 8/2004 | Goncalves et al. ........... 717/104 |
| 2005/0125142 A1 | 6/2005 | Yamane |
| 2005/0209815 A1 | 9/2005 | Russon et al. |
| 2006/0125691 A1 | 6/2006 | Menache et al. |
| 2008/0285805 A1 | 11/2008 | Luinge et al. |
| 2009/0093959 A1 | 4/2009 | Scherzinger et al. |
| 2009/0262974 A1 | 10/2009 | Lithopoulos |
| 2010/0063733 A1 | 3/2010 | Yunck |
| 2010/0141759 A1 | 6/2010 | Scherzinger |
| 2010/0172546 A1 | 7/2010 | Sharp |
| 2010/0174507 A1 | 7/2010 | Vogel |
| 2011/0007939 A1 | 1/2011 | Teng et al. |
| 2012/0330601 A1 | 12/2012 | Soubra et al. |

FOREIGN PATENT DOCUMENTS

| | | |
|---|---|---|
| EP | 1944572 A1 | 7/2008 |
| EP | 2240740 A1 | 10/2010 |
| WO | WO2009100773 | 8/2009 |
| WO | WO2009100774 | 8/2009 |
| WO | WO2009103342 | 8/2009 |
| WO | WO2009106141 | 9/2009 |
| WO | WO2010080950 | 7/2010 |

OTHER PUBLICATIONS

Lemaire et al. "Vision-Based SLAM: Stereo and Monocular Approaches", International Journal of Computer Vision 74(3), 343-364, Springer Science + Business Media, LLC, USA, 2007.

M.D. Chapman, M.G. Farley; "Monocular SLAM"; GPS World; Sep. 1, 2008.

* cited by examiner

Camera with a Georeferenced Object Image Database for Determining Camera Location from Feature Detection and Recognition, and Pattern Matching

METHOD AND APPARATUS FOR IMAGE-BASED POSITIONING

This application is a continuation-in-part of pending U.S. application Ser. No. 12/313,560 filed on Nov. 20, 2008, which was a divisional of U.S. application Ser. No. 11/303,676, filed Dec. 16, 2005, now U.S. Pat. No. 7,541,974 issued Jun. 2, 2009, which is incorporated by reference herein in its entirety.

This application is a continuation-in-part of pending U.S. application "IMAGE-BASED GEOREFERENCING", Ser. No. 12/559,322, filed on Sep. 14, 2009, which is incorporated by reference herein in its entirety.

This application is a continuation-in-part of pending U.S. application "IMAGE-BASED TRACKING", Ser. No. 12/459,843, filed on Jul. 7, 2009, which is incorporated herein in its entirety.

This application claims the benefit of the earlier filing date of the provisional US application "METHOD AND APPARATUS FOR IMAGE-BASED POSITIONING", Ser. No. 61/358,423, filed on Jun. 25, 2010

TECHNICAL FIELD

The technology relates to the field of navigation.

BACKGROUND

The parent patent application Ser. No. 12/313,560 (hereinafter called "Scherzinger") was directed to a system and method for obtaining precise survey-grade position data.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An image-based positioning method is provided, which overcomes limitations in the prior art.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

I. "Scherzinger"

Figure 1:
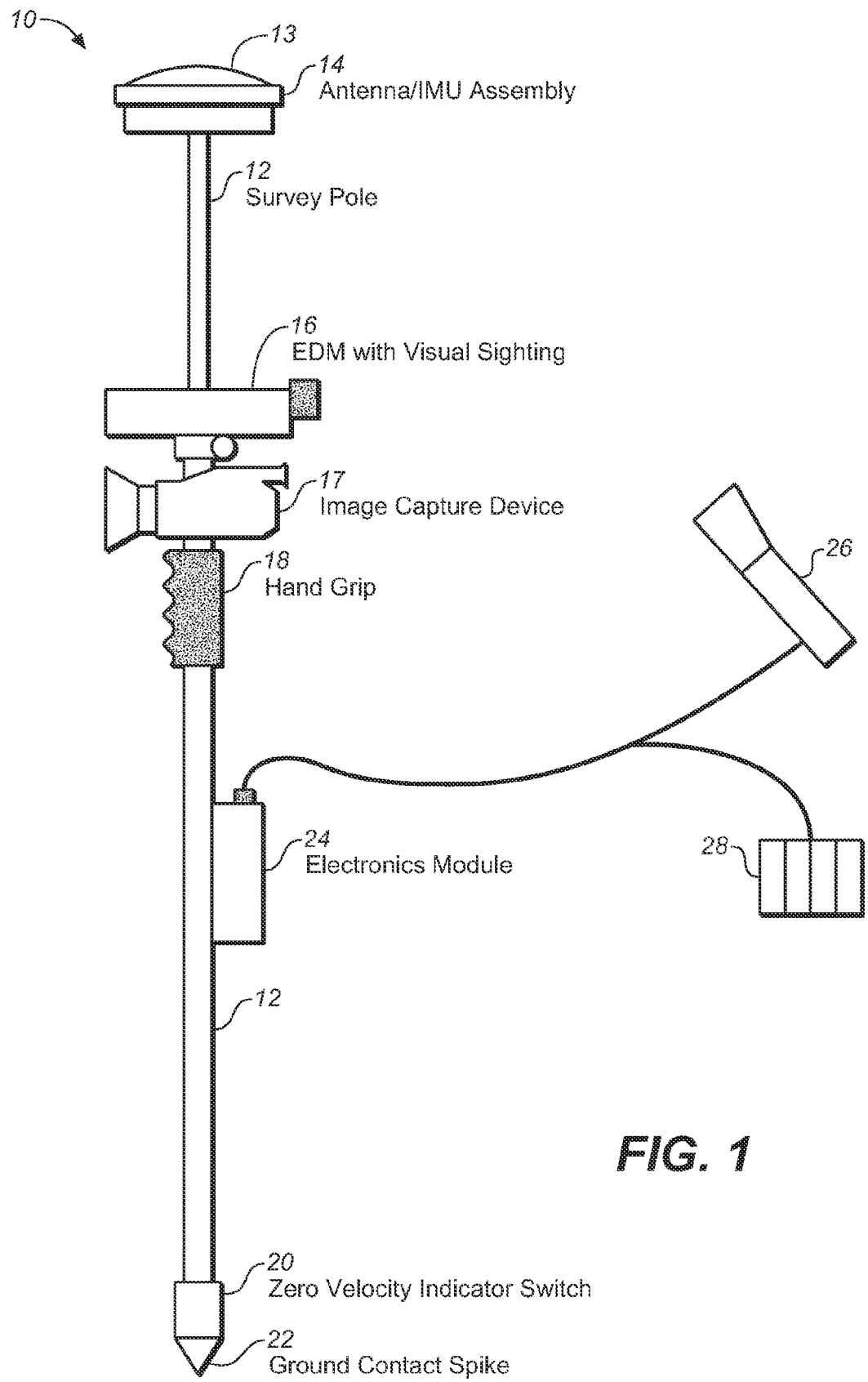
FIG. 1 shows a GIE survey instrument disclosed in "Scherzinger".

FIG. 1 shows GIE survey instrument 10 disclosed in "Scherzinger".

II. Single Object-Tracking Process.

Figure 2:
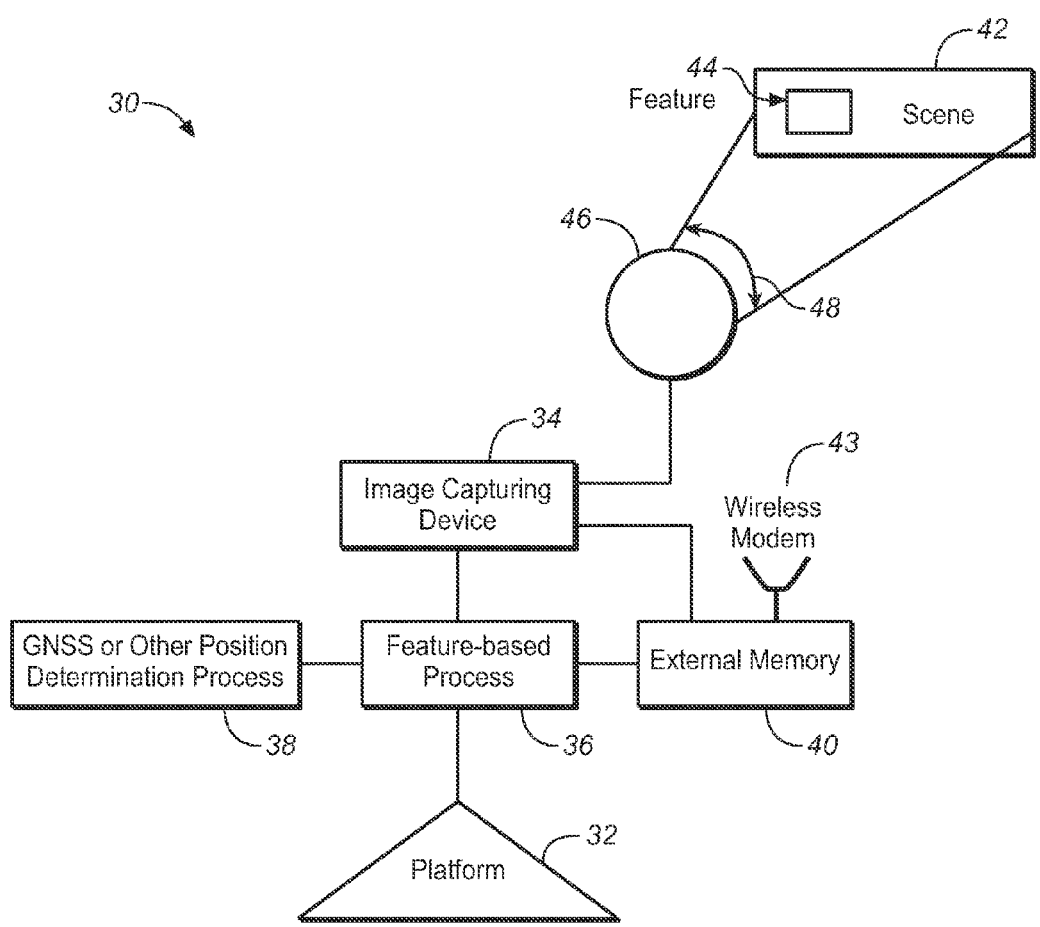
FIG. 2 illustrates an image-based positioning apparatus of the present technology comprising an image-capturing device configured to capture at least one image including at least one object, a feature-based process, and a position determination process.

In an embodiment of the present technology, FIG. 2 illustrates an image-based positioning apparatus 30 comprising an image-capturing device 34 configured to capture at least one image including at least one object; a position determination process 38, and a feature-based process 36 configured to process at least one image to track a location of at least one captured object.

In an embodiment of the present technology an object may contain one or more features; a feature is essentially a portion of the image that can be detected by an algorithm. They can be points, or regions, or contours, or abstract areas of texture, or anything else. In many of the algorithms discussed here, there is also the assumption that features can be identified across images (correspondences found), but this is not a part of the definition of a feature. Correspondence finding is an operation performed on features, not a characteristic of them.

In an embodiment of the present technology, the image-capturing device 34 can be from a group consisting of: a digital camera; a digital video camera; a digital camcorder; a stereo digital camera; a stereo video camera; a motion picture camera; a depth camera; and a television camera or the like.

Referring still to FIG. 2, in an embodiment of the present technology, the image-based positioning apparatus 30 further comprises a platform 32.

In an embodiment of the present technology, the platform 32 further comprises a rover.

In an embodiment of the present technology, the platform 32 further comprises a rover RTK system.

In an embodiment of the present technology, the platform 32, further comprises a GIS/Mapping handheld.

Referring still to FIG. 2, in an embodiment of the present technology, coordinates of a reference position of the image-capturing device 34 (or a platform 32) is determined by a GNSS position process 38.

A Global Navigational Satellite System (GNSS) process can be selected from the group consisting of: a GPS process; a GLONASS process; a combined GPS/GLONASS process; a GALILEO process; and a COMPASS (Beidou Navigation System) process, terrestrial based pseudolite process, or the like.

The Global Positioning System (GPS) is a system of satellite signal transmitters that transmits information from which an observer's present location and/or the time of observation can be determined. The GPS was developed by the United States Department of Defense (DOD) under its NAVSTAR satellite program.

Referring still to FIG. 2, in an embodiment of the present technology, as an alternative to a GNSS process, or if satellite signals are unavailable or compromised, coordinates of a reference position of the image-capturing device 34 (or a platform 32) is determined by a feature-based process selected from the group consisting of: inertial dead reckoning; a Simultaneous Location And Mapping (SLAM) process; a Match-Move process or similar image processing algorithm; and a photogrammetric process.

In an embodiment of the present technology, the feature-based process 36 is implemented by a Simultaneous Location And Mapping (SLAM) process.

The Simultaneous Location And Mapping (SLAM) process uses sequences of images from one or more video cameras to identify fixed features and then builds a map of these fixed features. Two image processing techniques can be applied.

The first image processing technique applied in the Simultaneous Location And Mapping (SLAM) method is image segmentation and feature extraction. SLAM uses this to identify particular objects that are known to be stationary and hence valid reference points in three dimensional (3D) space. Typical choices are objects with reasonably well-defined characteristics, often corners, in an outdoor setting or wall-mounted fixtures of various kinds (lights, switches, window ledges or corners) in an indoor setting. These characteristics can then be processed in software to yield features within the algorithm.

The second image processing technique applied in the Simultaneous Location And Mapping (SLAM) method is the method of stereo imaging used to extract depth and hence range-to-object information. SLAM builds a map of the features in a three dimensional (3D) coordinate grid as it images them from different robot positions, and thereby determines its own position in that grid. The mapping and self-location process is implemented in a Kalman filter that estimates all variables. In this case range extraction is done by using stereo imaging from multiple overlapping two dimensional (2D) images.

In an embodiment of the present technology, the Simultaneous Location And Mapping (SLAM) method utilizes a video camera.

In an embodiment of the present technology, the Simultaneous Location And Mapping (SLAM) method utilizes a charge-coupled device (CCD). CCD is a device for the movement of electrical charge, usually from within the device to an area where the charge can be manipulated, for example conversion into a digital value. This is achieved by "shifting" the signals between stages within the device one at a time. Technically, CCDs are implemented as shift registers that move charge between capacitive bins in the device, with the shift allowing for the transfer of charge between bins. Often CCD is integrated with an image sensor, such as a photoelectric device to produce the charge that is being read, thus making the CCD a major technology for digital imaging.

In an embodiment of the present technology, the Simultaneous Location And Mapping (SLAM) method utilizes a video camera having a CMOS sensor.

In an embodiment of the present technology, the Simultaneous Location And Mapping (SLAM) method utilizes a narrow Field Of View (FOV). For a given sensor size, this will provide a higher resolution view of a smaller overall area of the visible world and would permit detection of smaller objects. A wide FOV allows the camera to capture larger objects, or objects spread over a larger spatial domain but will not give the same resolution for a given sensor. The instrument would include a SLAM processing algorithm that receives images at a fixed frame rate, or at a variable frame rate dictated by the instrument dynamics, and then outputs the positions of the features it has identified and the instrument position all in a coordinate frame suitable for the application. Cartesian coordinates relative to the initial orientation of the instrument, Cartesian coordinates absolutely measured from a defined origin, latitude-longitude-altitude, and earth centered earth fixed; spherical coordinates relative to the initial orientation of the instrument. For further reference, please see: (i) Thomas Lemaire, Cyrille Berger, Il-Kyun Jung and Simon Lacroix, "*Vision-Based SLAM: Stereo and Monocular Approaches*", International Journal of Computer Vision 74(3), 343-364, 2007; and (ii) Moritz Köhler, Shwetak N. Patel, Jay W. Summet, Erich P. Stuntebeck, and Gregory D. Abowd, Institute for Pervasive Computing, Department of Computer Science ETH Zurich, 8092 Zurich, Switzerland, "*TrackSense: Infrastructure Free Precise Indoor Positioning Using Projected Patterns*".

In an embodiment of the present technology, the feature-based process 36 is implemented by using a Match Move process. The Match Move process comprises several steps. The first step is to identify and to track objects.

In an embodiment of the present technology, the feature tracking process consists of two steps. The first step is to derive position and orientation references from the features of the image. This step is commonly referred to as "feature detection".

The second step involves solving for three-dimensional (3D) motion. This process attempts to derive the motion of the image-capturing device 34 (of FIG. 2) by solving the inverse-projection of transformations detected in the features of an image from the 2D image plane into an estimate of the 3D motion of the image-capturing device 34. More specifically, when a point on the surface of a three dimensional object is photographed its position in the two-dimensional (2D) frame can be calculated by a three-dimensional (3D) projection function.

One can introduce a notion of an abstract camera. This abstract camera by definition is an abstraction that holds all the parameters necessary to model the image-capturing device 34 in a real or in a virtual world.

Thus, an abstract camera is basically a camera vector that includes as its elements the position of the image-capturing device 34, its orientation, focal length, and other possible parameters that define how the image-capturing device 34 focuses light onto the film plane. Exactly how this camera vector is constructed is not important as long as there is a compatible projection function P.

The projection function P takes as its input a camera vector (denoted camera) and another vector the position of a three-dimensional (3D) point in space (denoted xyz) and returns a two-dimensional (2D) point that has been projected onto a plane in front of the camera (denoted XY). Expressed as follows:

$$XY = P(\text{camera}, xyz). \tag{Eq. 1}$$

For example, in case of a feature projection, cameras at frames i and j project the view onto a plane depending on the parameters of the camera. In this way features tracked in two-dimensional (2D) space correspond to real features in a three-dimensional (3D) space.

However, the projection function transforms the real 3D feature and reduces the amount of information it contains. Without knowing the full information content of the component an inverse projection function P' can only return a set of possible 3D points that form a line emanating from the center of the camera and passing through the projected 2D point. A similar ambiguity arises in the interpretation of any orientation information contained in the projected feature. The inverse projection is expressed as:

$$xyz \in P'(\text{camera}, XY). \tag{Eq. 2}$$

or $$\{xyz : P(\text{camera}, xyz) = XY\}. \tag{Eq. 3}$$

In an embodiment of the present technology, if the features are on the surface of a rigid object such as a building, then the real point xyz will remain at the same place in real space from one frame of the image to the next one:

$$(xyz)_i = (xyz)_j; \tag{Eq. 4}$$

wherein the subscripts i and j refer to arbitrary frames in the shot that is being analyzed. It follows that:

$$P'(\text{camera}_i, XY_i) \cap P'(\text{camera}_j, XY_j) \neq \{\ \} \tag{Eq. 5}$$

Because the value of $XY_i$ has been determined for all frames that the feature is tracked through by the tracking program, one can solve the reverse projection function between any two frames as long as P' (camera$_i$, XY$_i$) ∩ P' (camera$_j$, XY$_j$) is a small set of possible camera vectors that solve the equation at i and j (denoted $C_{ij}$).

$$C_{ij} = ((\text{camera}_i, \text{camera}_j) : P'(\text{camera}_i, XY_i) \cap P'(\text{camera}_j, XY_j) \neq \{\ \}); \tag{Eq. 6}$$

It follows from (Eq. 6) that there is a set of camera vector pairs $C_{ij}$ for which the intersection of the inverse projections of two points $XY_i$ and $XY_j$ is a non-empty set centering around a stationary point xyz.

It also follows from (Eq. 6), that for any position of the image-capturing device 34 in space, there is a set of corresponding parameters (orientation, focal length, etc) that will photograph a one-point-feature exactly the same way. However, since a set of camera vector pairs $C_{ij}$ has an infinite number of elements, a one-point-feature is not sufficient to determine the actual position of the image-capturing device 34.

The more tracking information, in the form of additional point features or additional orientation information, the more precisely one can determine an actual position of the image-capturing device 34.

For a set of points $\{(xyz)_{i,0}, \ldots, (xyz)_{i,n}\}$ and $\{(xyz)_{j,0}, \ldots, (xyz)_{j,n}\}$ where i and j still refer to frames and n is an index to one of many tracking features being followed, one can derive a set of camera vector pair sets $\{C_{i,j,0}, \ldots, C_{i,j,n}\}$.

Using this approach of multiple tracks one will decrease the number of possible parameters of the camera. The set of possible camera parameters that fit, F, is the intersection of all sets:

$$F = C_{i,j,0} \cap \ldots \cap C_{i,j,n} \tag{Eq. 7}$$

The fewer the number of elements in this set F the closer one can come to extracting the actual parameters of the image-capturing device 34.

Due to errors introduced to the tracking process, a statistical approach is required to determine a camera vector for each frame. Optimization algorithms and bundle block adjustment can be utilized to narrow down the possible solutions to the motion of the camera.

Three-dimensional match moving tools make it possible to extrapolate three-dimensional information from two-dimensional photography. Programs capable of 3D match moving include, but are not limited to:

Voodoo (freeware; Scenespector VooCAT);
Icarus (University of Manchester);
Maya Live;
The Pixel Farm PFTrack;
PFHoe (based on PFTrack algorithms);
REALVIZ MatchMover;
Science.D.Visions 3DEqualizer (which won an Academy Award for Technical Achievement);
Andersson Technologies SynthEyes; and
Boujou (which won an Emmy award in 2002)

In an embodiment of the present technology, the feature-based process 36 is implemented by using a photogrammetric process.

Photogrammetry is the practice of determining the geometric properties of objects from photographic images. In the simplest example, the distance between two points that lie on a plane parallel to the photographic image plane can be determined by measuring their distance on the image, if the scale s of the image is known. This is done by multiplying the measured distance by 1/s.

A more sophisticated technique, called stereophotogrammetry, involves estimating the three-dimensional coordinates of points on an object. These are determined by measurements made in two or more photographic images taken from different positions (see stereoscopy). Common points are identified on each image. A line of sight (or ray) can be constructed from the camera location to the point on the object. It is the intersection of these rays (triangulation) that determines the three-dimensional location of the point. More sophisticated algorithms can exploit other information about the scene that is known a priori, for example symmetries, in some cases allowing reconstructions of 3D coordinates from only one camera position.

Algorithms for photogrammetry typically express the problem as that of minimizing the sum of the squares of a set of errors. This minimization is known as bundle adjustment and is often performed using the Levenberg-Marquardt algorithm (LMA) that provides a numerical solution to the problem of minimizing a function, generally nonlinear, over a space of parameters of the function. These minimization problems arise especially in least squares curve fitting and nonlinear programming.

The Levenberg-Marquardt algorithm (LMA) interpolates between the Gauss-Newton algorithm (GNA) and the method of gradient descent. The Levenberg-Marquardt algorithm (LMA) is more robust than the Gauss-Newton algorithm (GNA), which means that in many cases it finds a solution even if it starts very far off the final minimum.

The 3D coordinates define the locations of object points in the 3D space. The image coordinates define the locations of the object points' images on the film or an electronic imaging device. The exterior orientation of a camera defines its location in space and its view direction. The inner orientation defines the geometric parameters of the imaging process. This is primarily the focal length of the lens, but can also include the description of lens distortions. Further additional observations play an important role: With scale bars, basically a known distance of two points in space, or known fix points, the connection to the basic measuring units is created.

Photogrammetric data with dense range data from scanners complement each other. Photogrammetry is more accurate in the dimensions near parallel to the image plane while range data is generally more accurate in the in the dimension normal to the image plane. This range data can be supplied by techniques like LiDAR, Laser Scanners (using time of flight, triangulation or interferometry), White-light digitizers and any other technique that scans an area and returns x, y, z coordinates for multiple discrete points (commonly called "point clouds").

A 3D visualization can be created by georeferencing the photos and LiDAR data in the same reference frame. Techniques such as adaptive least squares stereo matching are then used to produce a dense array of correspondences which are transformed through a camera model to produce a dense array of x, y, z data.

Figure 3:
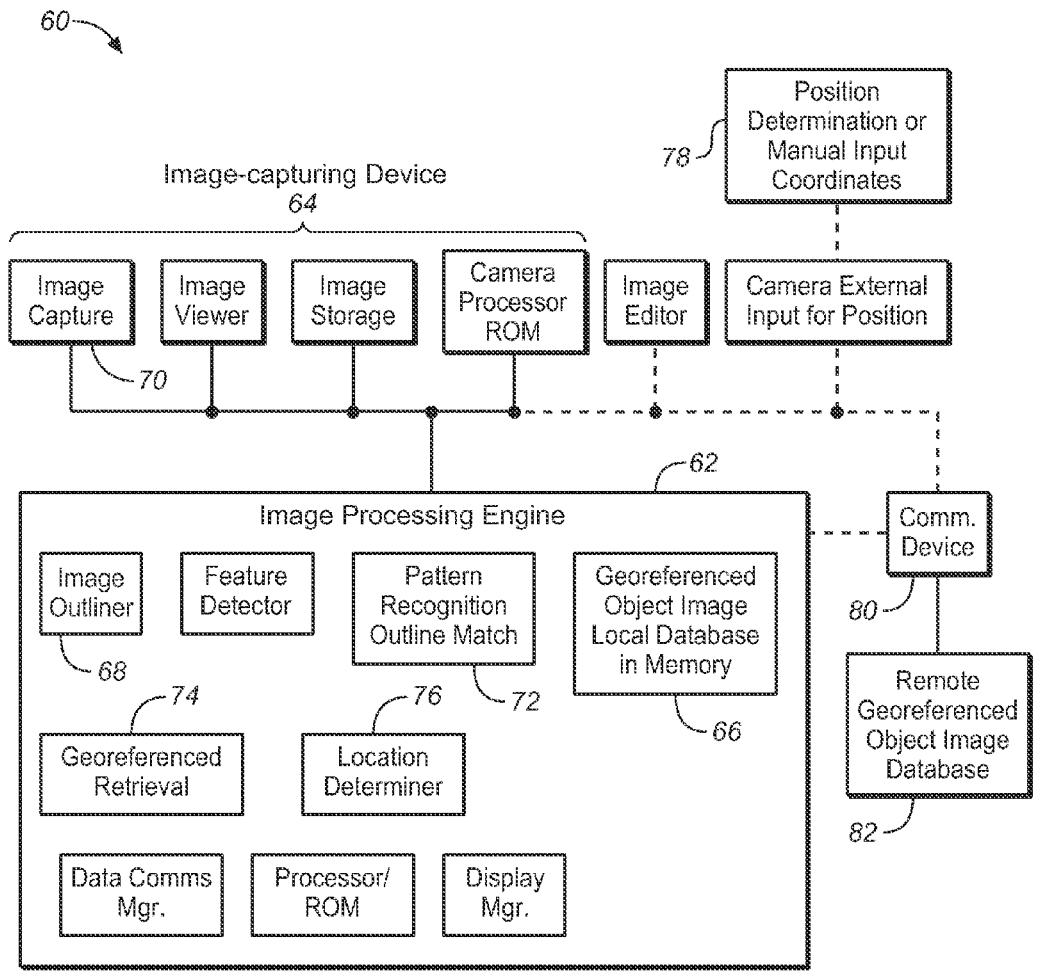
FIG. 3 depicts the feature-based process of FIG. 2 of the present technology implemented by using a georeferenced image-based process.

Referring still to FIG. 2, in an embodiment of the present technology, the feature-based process 36 is implemented by using a georeferenced image-based process, as illustrated in FIG. 3. The georeferenced image-based process 36 uses the method of "Image-Based Georeferencing" that was disclosed by James M. Janky et al. in the patent application Ser. No. 12/559,322, filed on Sep. 14, 2009. The patent application entitled "Image-Based Georeferencing" is incorporated herein in its entirety.

More specifically, the image processing engine 62 (of FIG. 3) is basically a series of computer programs that takes an image from the image image-capturing device 64, creates an outline of the objects in view by using an image outliner 68, does a search for a similar outline by searching in the Georeferenced Object Image Local Database 66, identifies features in the camera image 70 and looks for a match (by using a pattern recognition outline match process 72) with features in the database, and tests to see if the features found by the matching process have georeferenced location coordinates.

Referring still to FIG. 3, in an embodiment of the present technology, if there is a match with georeferenced coordinates, then the Georeferenced Retrieval program 74 extracts those coordinates from the database, and the Location Determiner 76 determines the location coordinates of the image-capturing device 64 by using the methods of feature-based processing like photogrammetry, Match Move, etc. Please, see discussion above.

Referring still to FIG. 3, in an embodiment of the present technology, the initial location of the image-capturing device 64 can be entered via block 78 at any level of precision, for example: (a) via a GNSS receiver; or (b) manually, as with the use of two names for an intersection; or (c) an approximate lat/long. In this embodiment of the present technology, this method of input of the initial position determination of the image-capturing device 64 can speed up the search process by going straight to the region of interest.

Referring still to FIG. 3, in an embodiment of the present technology, the manual position input can be done via a handheld device like the Trimble TSC2 (Trimble Survey Controller Model 2).

Referring still to FIG. 3, in an embodiment of the present technology, the Image Processing Engine 62 can be configured to reside in a portable computing device, such as a TSC2 data collector, or a laptop, or a personal digital assistant, or the Apple iPad. The inputs of the initial (seed) location of the image-capturing device 64 can be made via these devices.

Referring still to FIG. 3, in an embodiment of the present technology, the communication device 80 can be employed to provide a seed (an initial) location of the image-capturing device 64.

In an embodiment of the present technology, a wireless system, including Wi-Fi, cellular, ZigBee, or the like, can be used to connect the communication device 80 with an external database.

In an embodiment of the present technology, the Remote General Georeferenced Object Image Database 82 represents a well-populated database wherein local objects such as building roof corners, front doors, window ledges, street signs, fire hydrants, etc. literally everything on the earth, is geolocated and has an image from some arbitrary vantage point.

Therefore, the Remote General Georeferenced Object Image Database 82 can be used to input a seed location of the image-capturing device 64.

If this is the case, one can download a much localized update to the Locally Stored Georeferenced Object Image database 66 from the Remote General Georeferenced Object Image database 82. Using features in the pattern recognition Outline Match program 72, an image rotation and translation can be performed as part of the search for a match to the locally captured image.

In an embodiment of the present technology, more specifically, if a seed position fix is obtained by using a GPS position fix from a GPS/GNSS receiver or location information obtained from other means, it can be combined with a camera image by using the Exchangeable image file format (Exif). Exif is a specification for the image file format used by digital cameras. The specification uses the existing JPEG, TIFF Rev. 6.0, and RIFF WAV file formats, with the addition of specific metadata tags.

In an embodiment of the present technology, wherein a seed position fix is obtained by using a GPS position fix from a GPS/GNSS receiver, the accuracy of the seed position fix depends entirely on the sophistication and performance level of the GPS receiver. Simple GPS chipset receivers, used in cell phones equipped with cameras, provide an absolute accuracy on the order of 4-7 meters anywhere on the earth.

On the other hand, more sophisticated receivers employ a variety of correction techniques which can improve the accuracy dramatically. For example, the Wide Area Augmentation Service provided by the U.S. Federal Aviation Administration sends signals from 2 synchronous satellites on the same frequency as the GPS signal, with a special code and improves the accuracy to about 1 meter nationwide. Other differential services offer improvements to about 20 cm. Finally, the Real Time Kinematic method with Virtual Reference Station service can provide accuracy to about 2-5 cm, relative to a known reference point.

In an embodiment of the present technology, referring still to FIG. 3, a camera image is provided to a portable Image Processing Engine 62 for determining the position of the camera more accurately than can be done with a simple GPS receiver. The camera image is provided in real time, or can be post-processed according to the principles explained in a co-pending application "Image-Based Georeferencing".

In an embodiment of the present technology, referring still to FIG. 3, the portable Image Processing Engine 62 is supplied with Local Georeferenced Object Image database 66, which contains images of buildings and other objects, along with georeferenced features identified in the database. The georeferencing data may consist of latitude, longitude, and altitude information, or may be stored in terms of "northing and easting" from a local reference point, such as surveyor's marks installed and maintained by the U.S. Geological Survey Administration. Other coordinate systems may be used as well.

In an embodiment of the technology, the Local Georeferenced Object Image database 66, is configured to be searchable, by being enabled with appropriate tags.

In an embodiment of the technology, the Local Georeferenced Object Image database 66 can be implemented by using Google's StreetView or similar type service. The Local Georeferenced Object Image database 66 associates location information with the location tags in lat/long coordinates associated with each section of pictures thus enabling a search engine. Therefore, a user can find an image of a street view based on its address or based on its location in lat/long coordinates. The street intersections are also available for searching.

In an embodiment of the technology, the Local Georeferenced Object Image database 66 can be implemented by using the georeferenced object image. The georeferenced object image database contains a plurality of precise position data related to building's features and edges, stop signs, street signs, fire hydrants, and the like. The georeferenced object image database further includes the Image Processing Engine equipped with suitable analytic software configured to deduct from known feature positions on a given object to features that may be in an image captured a user. This deduction can be performed by using the interpolation method that utilizes suitable geometric transforms to regularize the image and to find the geometric relationships (distance and direction) from known georeferenced features to unknown but more suitable features.

In an embodiment of the technology, determining position of a camera from data in an image is done by using photogrammetric methods, and is well-known in the arts. Please see discussion above.

In an embodiment of the technology, the distance scale factor needed to perform photogrammetric solutions may be found from processing georeferenced data associated with objects of interest in the captured image. The georeferenced data for two or more points immediately makes it possible to create the distance scale factor by simply calculating the three-dimensional distance between the two selected points by using the well-known formula:

$$\text{Distance} = \sqrt{((x1-x2)^2 + (y1-y2)^2 + (z1-z2)^2)}, \quad \text{(Eq. 8)}$$

where x, y and z are the georeferenced coordinates of the points associated with the object of interest.

In an embodiment of the technology, the Image Processing Engine (62 of FIG. 3) provides off-the-shelf photogrammetric image processing algorithms that then enable the calculation of the location of the camera based on the use of selected reference points in the captured image. The selection process utilizes a search routine that finds edges (intersections of two lines) or corners in the captured image. Edges or corners with the sharpest corner, or point, are automatically selected. If the selected edges/corners are not associated with a georeferenced data point, then the interpolation algorithm is used to estimate the georeferenced data for the selected points. (Please, see discussion above.)

In an embodiment of the technology, the selected reference points in the captured image are then used to calculate the position of the camera 64. If three or more points are selected, then the calculation process proceeds through a series of steps to calculate the position directly.

A scale factor is determined via the calculable distances between the selected reference points, in terms of their georeferenced location data. The scale factor is found in terms of physical distance, in meters or feet, or subtended angle at the earth's surface.

Figure 4:
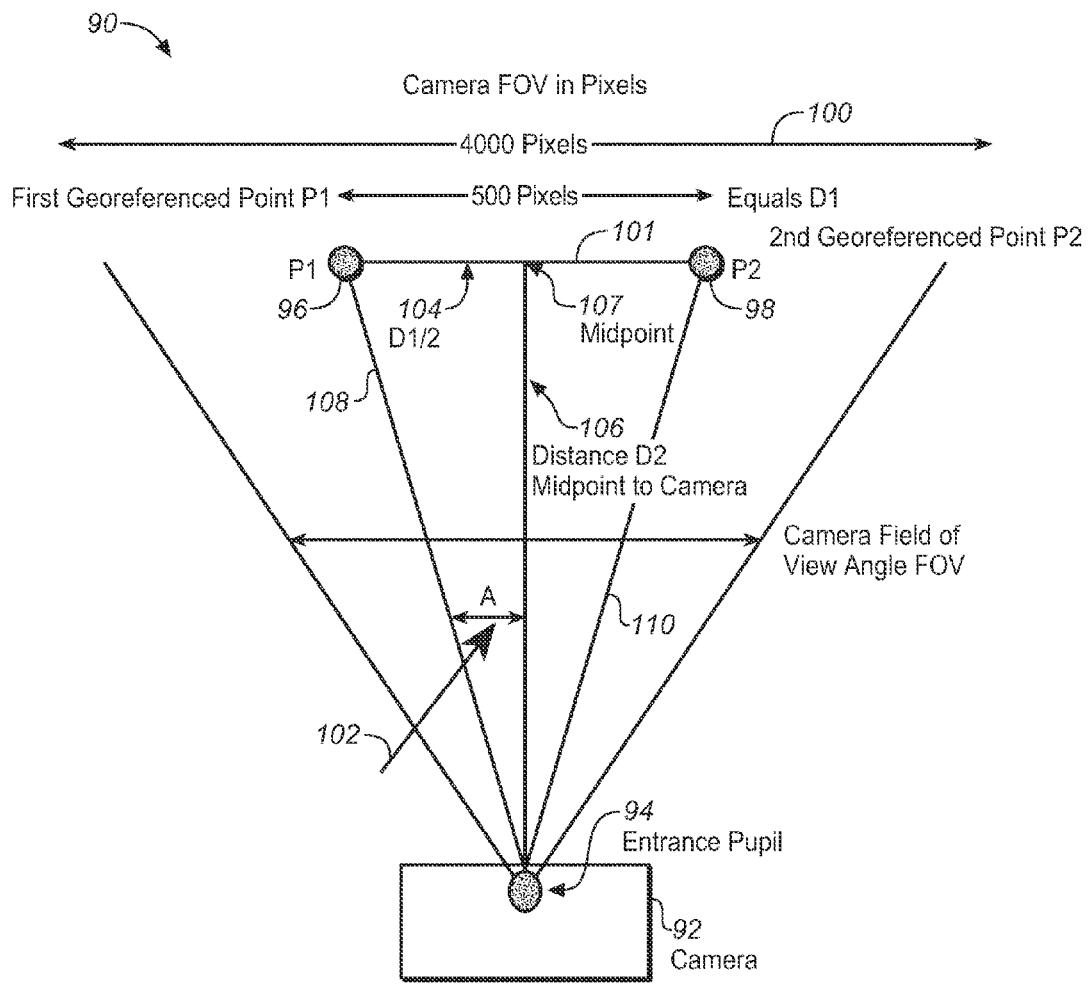
FIG. 4 illustrates the photogrammetric method to find a distance to a camera from a known distance between 2 points (scale factor) and pixel conversion to a subtended angle.

Next, an angle between the first two georeferenced points is determined, as shown in FIG. 4. More specifically, FIG. 4 illustrates the photogrammetric method to find a distance 106 to a camera 92 from a known distance $D_1$ 101 between 2 points $P_1$ 96 and $P_2$ 98, (scale factor) and pixel conversion to a subtended angle. In geometry, an angle subtended by an arc is one whose two rays pass through the endpoints of the arc.

In a digital camera 92, it is done by measuring the distance between the two points $P_1$ 96 and $P_2$ 98, and then taking the ratio of that number to the total number of pixels 100 in the camera's field of view. Using half this angle A 102, and half the distance ½D 104 between the 2 georeferenced points, the distance 106 from the midpoint 107 of the line between the 2 selected georeferenced points to the camera entrance pupil 94 is calculated, since the tangent of the half angle between the two selected points is given by the ratio of the distance from the camera to half the known distance between the two points for one type of problem solving.

$$\text{Tan}(A) = D_1/2D_2 \quad \text{(Eq. 9)}$$

In an embodiment of the technology, this process of determining more distance estimates from the midpoints of lines connecting any two georeferenced points on objects in the captured image may be carried out. Now the midpoint between any two known georeferenced points can also be calculated in terms of a georeferenced coordinate system.

The distances just described are not the distances required for determining the position of the camera. But with this information, the hypotenuse (long side) 108, which is the actual distances from the point $P_1$ 96 to the camera entrance pupil 94, (and the hypotenuse 110, which is the actual distances from the point $P_2$ 98 to the camera entrance pupil 94) can now be calculated as follows for one type of problem solving:

$$\text{Distance}(P1-\text{Camera}) = \frac{1}{2}D \cdot \sin(A); \quad \text{(Eq. 10)}$$

where ½ D is half the distance between $P_1$ and $P_2$, and A is the half-angle of the total angular displacement for the two points $P_1$ and $P_2$.

In an embodiment of the technology, referring still to FIG. 4, as an aid to understanding the next steps, the georeferenced points $P_1$ 96 and $P_2$ 98 now serve as the centers of spheres, and the distance from each point to the camera entrance pupil 94 provide a radius for each sphere. So with a minimum of three known georeferenced points, three lines with three points provide three equations representing the distance to the camera. That is, the three spheres will intersect at the camera entrance pupil, with some error. Solving for the location of this intersection (three equations in three unknowns) now gives the georeferenced point of the entrance pupil. This is the so called triangulation method.

In an embodiment of the technology, if there are more than three known points, then the system of equations is over determined. Most photogrammetric programs use many more points to help reduce the errors.

The method of least squares is a standard approach to the approximate solution of over determined systems, i.e. sets of equations in which there are more equations than unknowns.

"Least squares" means that the overall solution minimizes the sum of the squares of the errors made in solving every single equation.

The most important application is in data fitting. The best fit in the least-squares sense minimizes the sum of squared residuals, a residual being the difference between an observed value and the value provided by a model. Least squares problems fall into two categories, linear least squares and nonlinear least squares, depending on whether or not the residuals are linear in all unknowns. The linear least-squares problem occurs in statistical regression analysis; it has a closed form solution. The non-linear problem has no closed solution and is usually solved by iterative refinement; at each iteration the system is approximated by a linear one, thus the core calculation is similar in both cases. Least squares correspond to the maximum likelihood criterion if the experimental errors have a normal distribution and can also be derived as a method of moments estimator. Also, by iteratively applying local quadratic approximation to the likelihood, the least-squares method may be used to fit a generalized linear model.

There are many photogrammetric programs available which perform the above steps. Further, the process of determining the exact orientation of both the camera taking the picture relative to the georeferenced points, to compensate for the fact that there is tilt in the system of lines, is also taken into account. Having a multiplicity of reference points, or at least two images from two different camera locations, provides sufficient data to determine camera position.

In the event the user elects to take more than one picture of the scene containing the object of interest, additional processing is also readily available to handle this other main case. This process may be done all at once via the method known as "bundle adjustment".

Given a image depicting a number of 3D points from different viewpoints, a bundle adjustment can be defined as the problem of simultaneously refining the 3D coordinates describing the scene geometry as well as the parameters of the relative motion and the optical characteristics of the camera(s) employed to acquire the images, according to an optimality criterion involving the corresponding image projections of all points.

Bundle adjustment is almost always used as the last step of every feature-based 3D reconstruction algorithm. It amounts to an optimization problem on the 3D structure and viewing parameters (i.e., camera pose and possibly intrinsic calibration and radial distortion), to obtain a reconstruction which is optimal under certain assumptions regarding the noise pertaining to the observed image features.

If the image error is zero-mean Gaussian, then bundle adjustment is the Maximum Likelihood Estimator. Its name refers to the "bundles" of light rays originating from each 3D feature and converging on each camera's optical center, which are adjusted optimally with respect to both the structure and viewing parameters.

During the bundle adjustment process the re-projection error between the image locations of observed and predicted image points is minimized, which is expressed as the sum of squares of a large number of nonlinear, real-valued functions. Thus, the minimization is achieved using nonlinear least-squares algorithms. By iteratively linearizing the function to be minimized in the neighborhood of the current estimate, the Levenberg-Marquardt algorithm involves the solution of linear systems known as the normal equations. When solving the minimization problems arising in the framework of bundle adjustment, the normal equations have a sparse block structure owing to the lack of interaction among parameters for different 3D points and cameras. This can be exploited to gain computational benefits by employing a sparse variant of the Levenberg-Marquardt algorithm which explicitly takes advantage of the normal equations zeros pattern, avoiding storing and operating on zero elements.

Figure 5:
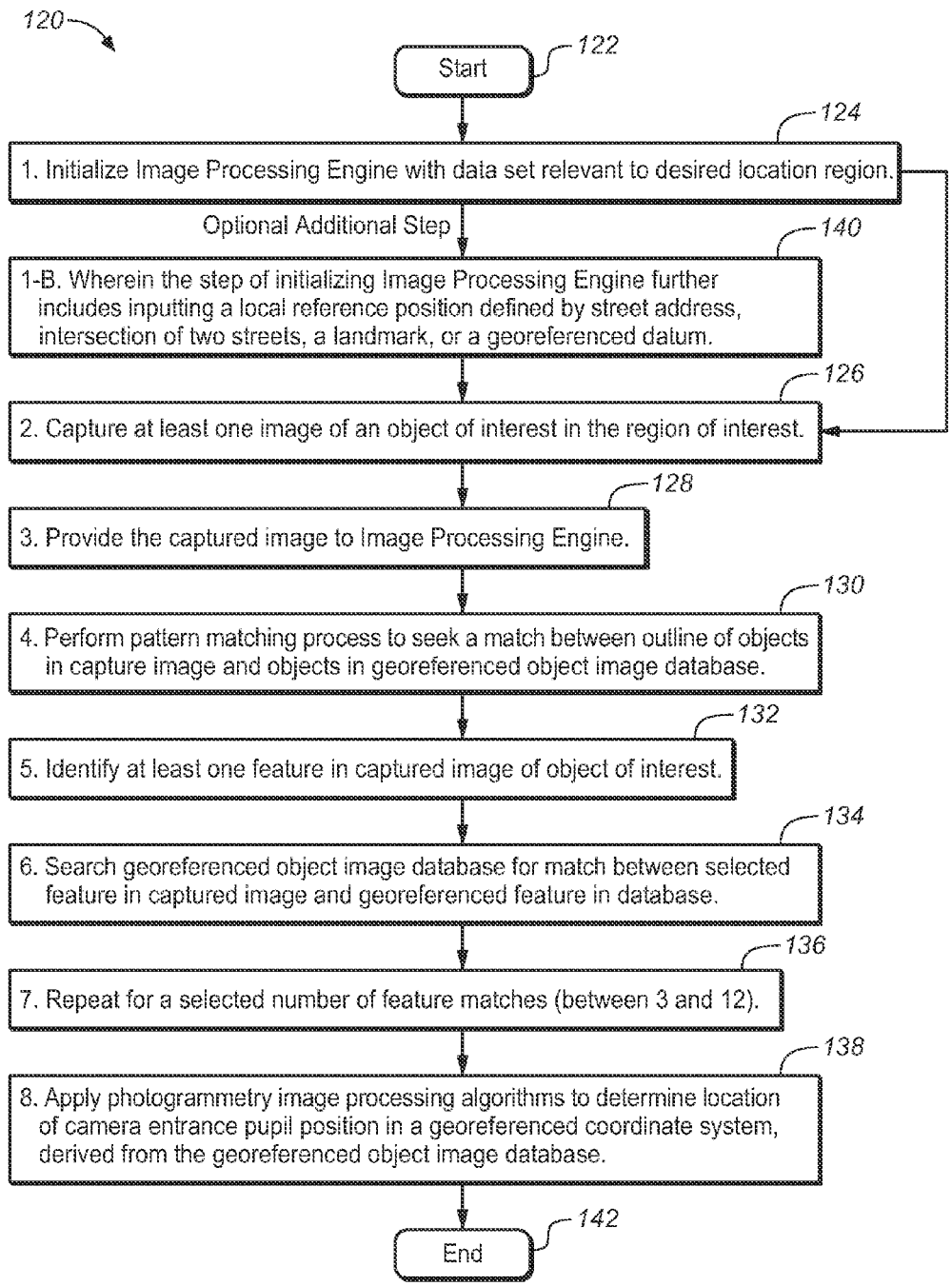
FIG. 5 illustrates the flow chart that describes the steps of implementing the feature-based process of FIG. 2 by using the georeferenced object image database and image processing engine of FIG. 3.

In an embodiment of the present technology, FIG. 5 illustrates the flow chart 120 that describes the steps of implementing the feature-based process 36 (of FIG. 2) by using the Georeferenced Object Image Database 66 and Image Processing Engine 62 (of FIG. 3).

More specifically in one embodiment, at step 124 the Image Processing Engine 62 (of FIG. 3) can be initialized with data set relevant to desired location region. Next, at step 126, the image capturing device 64 captures at least one image of an object of interest in the region of interest and provides (at step 128) at least one captured image of interest to the Image processing engine 62 (of FIG. 3). The pattern matching process is performed (step 130) to seek a match between outline of objects in capture image and objects in the Georeferenced Object Image Database 66. After at least one feature in captured image of object of interest is identified (step 132) the search in the Georeferenced Object Image Database 66 is performed (step 134) for match between the selected feature in captured image and georeferenced feature in the database 66. The search process is repeated (step 136) for a selected number of feature matches. At step 138, the photogrammetric image processing algorithms are applied to determine location of camera entrance pupil position (94 of FIG. 4) in a georeferenced coordinate system, derived from the Georeferenced Object Image Database. Optionally, (step 140), additional the step 124 of initializing image processing engine further includes inputting a local reference position defined by street address, intersection of two streets, a landmark, or a georeferenced datum.

Figure 6:
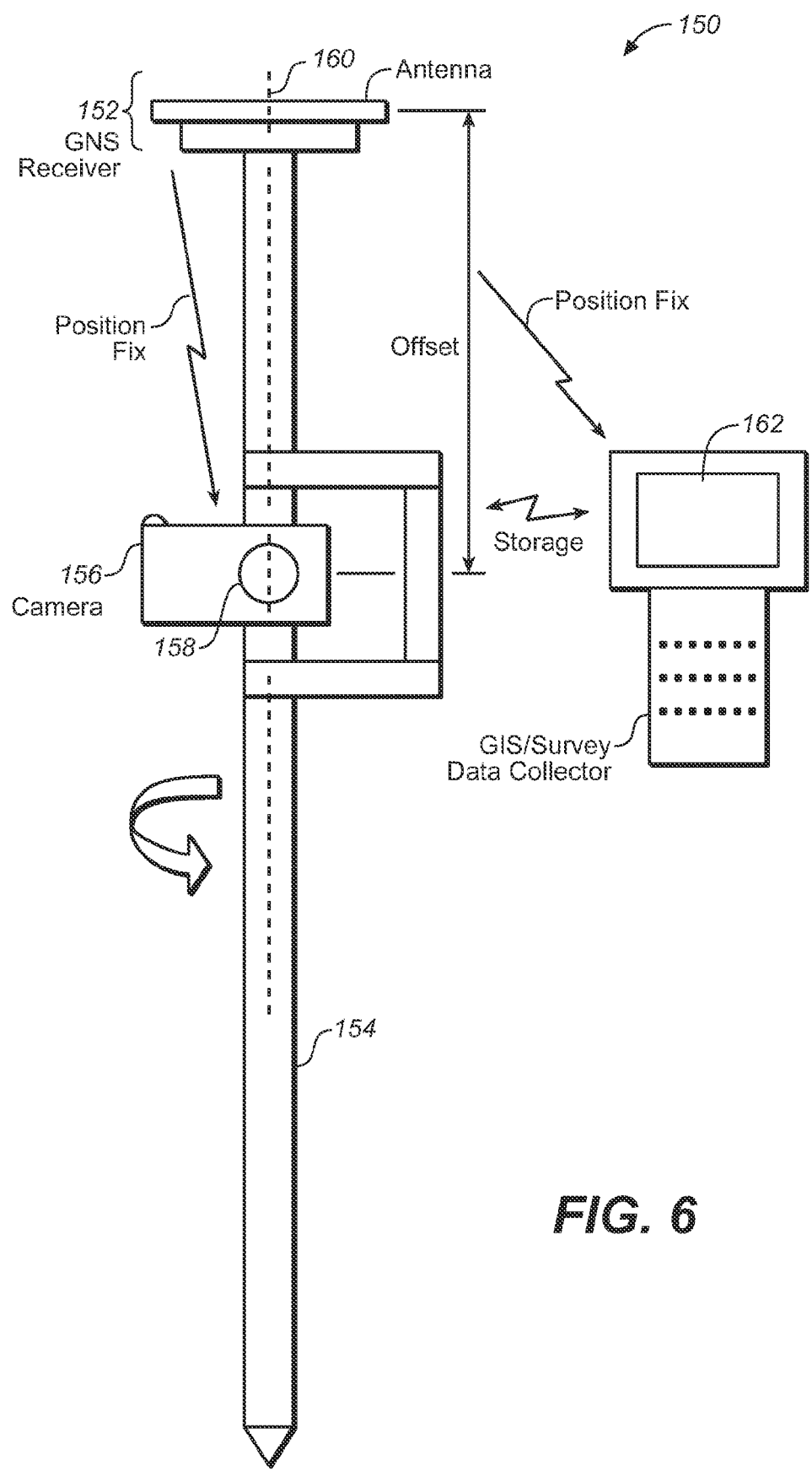
FIG. 6 shows the device for the georeferenced image-based positioning for the purposes of the present technology including a GPS receiver mounted on a pole, with a camera mounted on the same pole with its optical center aligned with the pole's axis, and the GIS/Survey Data collector.

In an embodiment of the present technology, FIG. 6 shows the device for image-based positioning 150 including a GNSS receiver 152 mounted on a pole 154, with a camera 156 mounted on the same pole 154. It also shows the GIS/Survey Data collector 162, like a TSC2.

Figure 7:
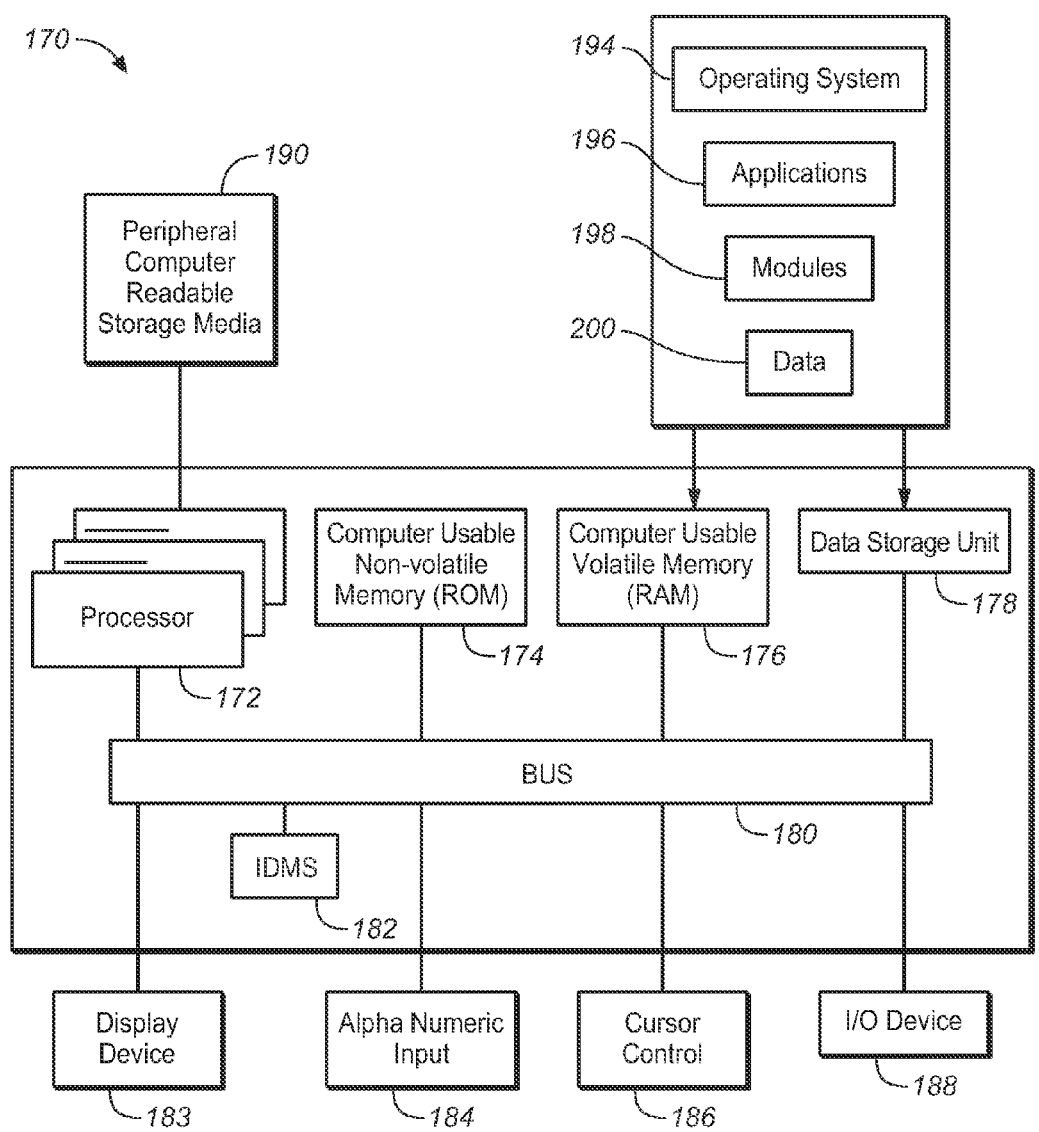
FIG. 7 illustrates a computer system configured to enable the image processing engine of FIG. 3 for the purposes of the present technology.

In an embodiment of the present technology, FIG. 7 illustrates a computer system 170 configured to enable the image processing engine 62 of FIG. 3. The hardware part included a processor 172, a computer usable non-volatile memory (ROM) 174, a computer usable volatile memory 176, a data storage unit 178, bus 180, image database management system (IDMS) 182, display device 183, an alpha-numeric input 184, cursor control 186, I/O device 188, and peripheral computer readable storage media 190. The software block 192 includes operating system 194, applications 196, modules 198 and data block 200. This is merely meant as an example of such a computer system. Actual computer systems that do not include all of the listed components, or which include parts not listed, may still be suitable to enabling the image processing engine.

III. Image-Based Positioning Apparatus Including Double Object—Tracking Process.

Figure 8:
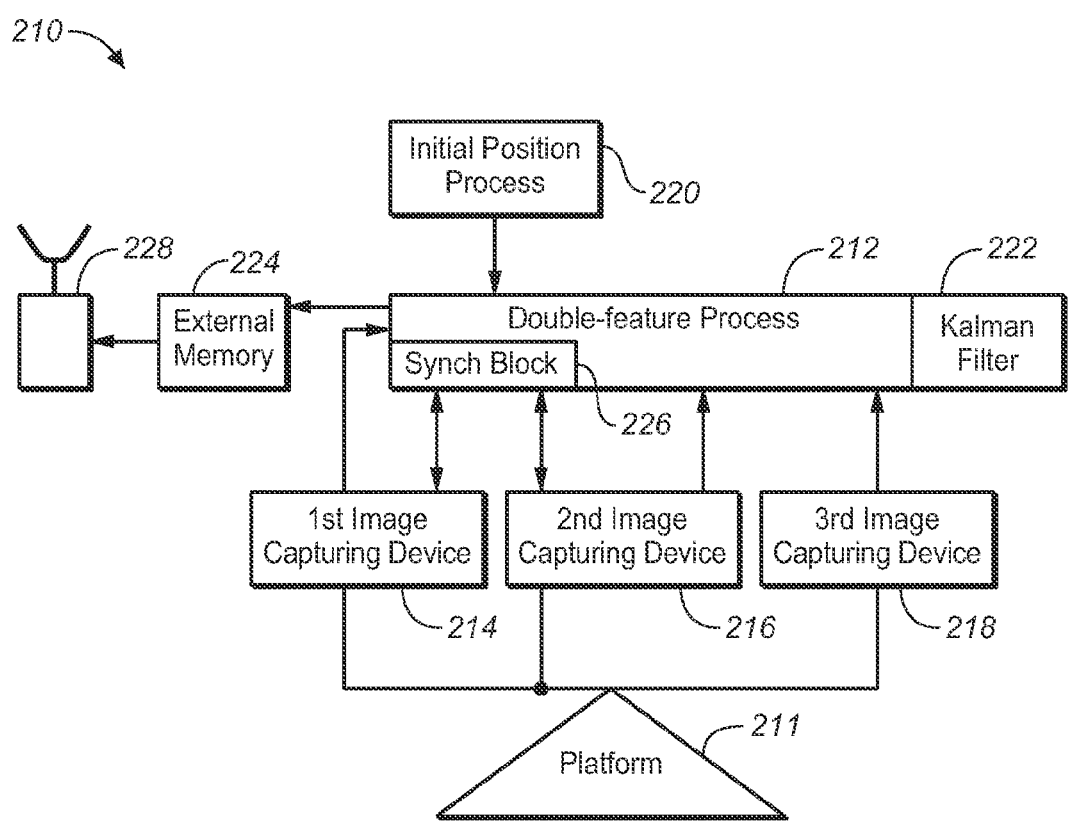
FIG. 8 shows an image-based positioning apparatus including the double feature-tracking process for the purposes of the present technology.

In an embodiment of the present technology, FIG. 8 shows an image-based positioning apparatus 210 including the double feature-tracking process 212. The process 212 can be implemented by using a general purpose processor, or by using an application specific processor (ASIC, FPGA, PLD, etc).

In an embodiment of the present technology, the image-based positioning apparatus 210 further comprises at least two image-capturing devices 214 and 216 (the third device 218 is optional) mounted on a platform 211.

In an embodiment of the present technology, image-capturing devices 214 and 216 have overlapping fields of view.

In an embodiment of the present technology, image capturing devices 214 and 216 have non-overlapping fields of view.

In an embodiment of the present technology, the platform 211 comprises a rover.

In an embodiment of the present technology, the platform 211 comprises a rover RTK system.

In an embodiment of the present technology, the platform 211 comprises a GIS/Mapping handheld.

In an embodiment of the present technology, each image-capturing device 214 and 216 (and 218 optionally) is configured to capture an image including at least one feature at a first position of the platform 211 and at a second position of the platform 211.

In an embodiment of the present technology, the image-based positioning apparatus 210 further comprises a synchronizing block 226 configured to synchronize the first image-capturing device 214 and the second image-capturing device 216 (and optionally, the third image-capturing device 218). Please, see discussion below.

In an embodiment of the present technology, the synchronizing block 226 is implemented by using a control signal generated by a controller (not shown).

In an embodiment of the present technology, the image-based positioning apparatus 210 further comprises a position process 220 selected from the group consisting of: a GNSS process; an image-matched photogrammetric process; a georeferenced-image-based process; a match move process; a surface track process; and a SLAM process.

The operations of a GNSS process; an image-matched photogrammetric process; a georeferenced-image-based process; a match move process; a surface track process; and a SLAM process were disclosed in details in the above-given discussions. The position process 220 is configured to obtain a position of the platform 211.

In an embodiment of the present technology, the double feature-based process 212 is configured to process each image obtained at the first and at the second position of the platform 211 to extract a set of tracking data for at least two features. The double feature-based process 212 is also configured to determine the location of the second position of the platform 212 by using the set of tracking data obtained for each at least two captured features.

In an embodiment of the present technology, the process 212 is also configured to process an image including at least one feature obtained at the first and at the second position of the platform 211 by the third image-capturing device 218 to extract a set of tracking data for at least one captured feature. In this embodiment of the present technology, process 212 is also configured to determine the location of the second position of the platform 212 by using the set of tracking data obtained for each at least one captured feature.

In an embodiment of the present technology, the image-based positioning apparatus 210 further comprises a Kalman filter 222. Kalman filter 222 is configured to obtain a Kalman-estimate of the second position of the platform 211 by combining the set of tracking data of at least one first captured feature as a first noisy measurement and the set of tracking data of at least one second captured feature as a second noisy measurement. Optionally, Kalman filter 222 is configured to obtain a Kalman-estimate of the second position of the platform 211 by combining the set of tracking data of at least one first captured feature as a first noisy measurement, the set of tracking data of at least one second captured feature as a second noisy measurement, and the set of tracking data of at least one third captured feature as a third noisy measurement.

In an embodiment of the present technology, the image-based positioning apparatus 210 further comprises an external memory block 224 configured to store at least one feature-based three-dimensional (3D) position coordinates of the platform for further processing.

In an embodiment of the present technology, the image-based positioning apparatus 210 further comprises a wireless modem 228 configured to provide a remote Internet access to the external memory block 224.

IV. Modes of Operation of Image-Based Positioning Apparatus Including Double Object-Tracking Process A. Synchronous Operation.

In an embodiment of the present technology, the synchronous operation of the image-based positioning apparatus 210 of FIG. 8 comprises capturing a first image by using a first image-capturing device 214 (a first-first image) at a first position of the platform 211, wherein the first-first image includes at least one first object.

In an embodiment of the present technology, a position of the platform 211 is determined by using the position process 220 (of FIG. 8) selected from the group consisting of: GNSS process; a surface tracking process; a feature-based process; and a georeferenced image-based process.

In an embodiment of the present technology, a position of the platform 211 is pre-determined.

Next, a second image is captured by using the first image-capturing device 214 (a second-first image) at a second position of the platform 211, wherein the second-first image includes at least one of the same first captured objects.

The first-first image and the second-first image are processed by using process 212 to lock on and to track a location of at least one first captured object. Process 212 is configured to obtain a set of two-dimensional position fixes for at least one first captured object from processing the first-first set and the second-first image that provide a set of tracking data for the first captured object.

In an embodiment of the present technology, a tracking algorithm can be used to lock onto at least one captured first object and to follow the locked first object through series of multiple frames. Please, see the discussion above and Equations (1-7).

Similarly, a first image is captured by using a second image-capturing device 216 (of FIG. 8) (a first-second image) at the first position of the platform 211, wherein the first-second image includes at least one second object.

In an embodiment of the present technology, a synchronizing block 226 can be used to synchronize the operations of the first image-capturing device 214 (of FIG. 8) and the second image-capturing device 216 (of FIG. 8) so that both devices capture first and second object (respectively) located in corresponding FOV for each device at the same time wherein the platform 211 is located at the same position.

A second image is captured by using the second image-capturing device 216 (of FIG. 8) (a second-second image) of at the second position of the platform 211; wherein the second-second image includes at least one the same second captured object.

In an embodiment of the present technology, the synchronizing block 226 can be used to synchronize the operations of the first image-capturing device 214 (of FIG. 8) and the second image-capturing device 216 (of FIG. 8) so that both devices capture first and second object (respectively) located in corresponding FOV for each device at the same time wherein the platform 211 is located at the same second position.

The first-second image and the second-second image are processed by using process 212 to track a location of at least one second captured object. Process 212 is configured to obtain a set of two-dimensional position fixes for at least one second captured object from processing the first-second set and the second-second image that provide a set of tracking data for the second captured object.

In an embodiment of the present technology, the tracking algorithm can be used to track at least one captured second object and to follow the first feature through a series of multiple frames. Please, see the discussion above and Equations (1-7).

The location of the platform 211 is determined by the double-feature process 212 by using the set of tracking data of at least one first object and the set of tracking data of at least one second object.

More specifically, in an embodiment of the present technology, the process 212 applies an inverse-projection function to the set of two-dimensional (2D) tracking data of at least one first captured object to solve for a set of three-dimensional (3D) coordinates for the position of the platform 211.

More specifically, in an embodiment of the present technology, the process 212 applies an inverse-projection function to the set of two-dimensional (2D) tracking data of at least one second object to solve for a set of three-dimensional (3D) coordinates for the position of the platform 211. Please, see the discussion above and Equations (1-7).

In an embodiment of the present technology, a first weight is assigned to a set of tracking data of at least one first captured object, and a second weight is assigned to a set of tracking data of at least one second captured object. In this embodiment of the present technology, the determination of the location of the position of the platform 211 is done by process 212 by using the set of weighted tracking data of at least one first captured object and the set of weighted tracking data of at least one second captured object.

In an embodiment of the present technology, a Kalman filter 222 is used to obtain a Kalman-estimate of the position of the platform 211 by combining the set of tracking data of at least one first captured object as a first noisy measurement and the set of tracking data of at least one second captured object as a second noisy measurement.

B. Asynchronous Operation.

In an embodiment of the present technology, the asynchronous operation of the image-based positioning apparatus 210 of FIG. 8 is based on the first image-capturing device 214 and second image-capturing device 216 capturing corresponding images at different times (non-synchronized).

In an embodiment of the present technology, the asynchronous operation of the image-based positioning apparatus 210 of FIG. 8 comprises the following steps: capturing a first image by using a first image-capturing device 214 (a first-first image) at a first position of the platform 211; wherein the first-first image includes at least one first object; capturing a second image by using the first image-capturing device 214 (a second-first image) at a second position of the platform 211; wherein said second-first image includes at least one captured first object; processing the first-first image and the second-first image to track a location of at least one captured first object; wherein a set of two-dimensional position fixes for at least one captured first object is obtained from processing the first-first image and the second-first image, providing a set of tracking data for the captured first object.

In an embodiment of the present technology, the asynchronous operation of the image-based positioning apparatus 210 of FIG. 8 further comprises the following steps: capturing a first image by using a second image-capturing device 216 (a first-second image) at a third position of the platform 211; wherein the first-second image includes at least one second object; capturing a second image by using the second image-capturing device 216 (a second-second image) at a fourth position of the platform 211; wherein the second-second image includes at least one second captured object; processing the first-second image and the second-second image to track a location of at least one second object; wherein a set of two-dimensional position fixes for at least one second captured object is obtained from processing the first-second image and the second-second image, providing a set of tracking data for the second object.

In an embodiment of the present technology, the asynchronous operation of the image-based positioning apparatus 210 of FIG. 8 further comprises determining the position of the platform 211 by using the set of tracking data of at least one first captured object. In this embodiment of the present technology, a position of the platform 211 can be determined by the position process 220.

In an embodiment of the present technology, the asynchronous operation of the image-based positioning apparatus 210 of FIG. 8 further determining the location of the fourth position of the platform 211 by using the set of tracking data of at least one second captured object. In this embodiment of the present technology, another position of the platform 211 can be determined by the position process 220.

In this "asynchronous" embodiment of the present technology, another position of the platform 211 can be obtained by performing a linear interpolation of the previous positions of the platform 211 without actually capturing any new images by devices 214 and 216.

As a further example the moving platform 211 can briefly enter a "dark" area where both the first image-capturing device 214 and the second image-capturing device 216 are not receiving sufficient light to generate a usable image. Thus, at least a position of the moving platform 211 in this dark area can be obtained by performing a linear interpolation of the two preceding (to entering the "dark" area) positions of the platform 211 (obtained by using both devices 214 and 216) without actually capturing any new images in the "dark" area by the devices 214 and 216. Interpolation can simply rely on time division of the line between the available positions, or it can incorporate information known about the velocity, acceleration, and higher order derivatives of motion as well as orientation and rotation information. The information used for interpolation may be derived from the double-feature process 212 or the position process 220.

Figure 9:
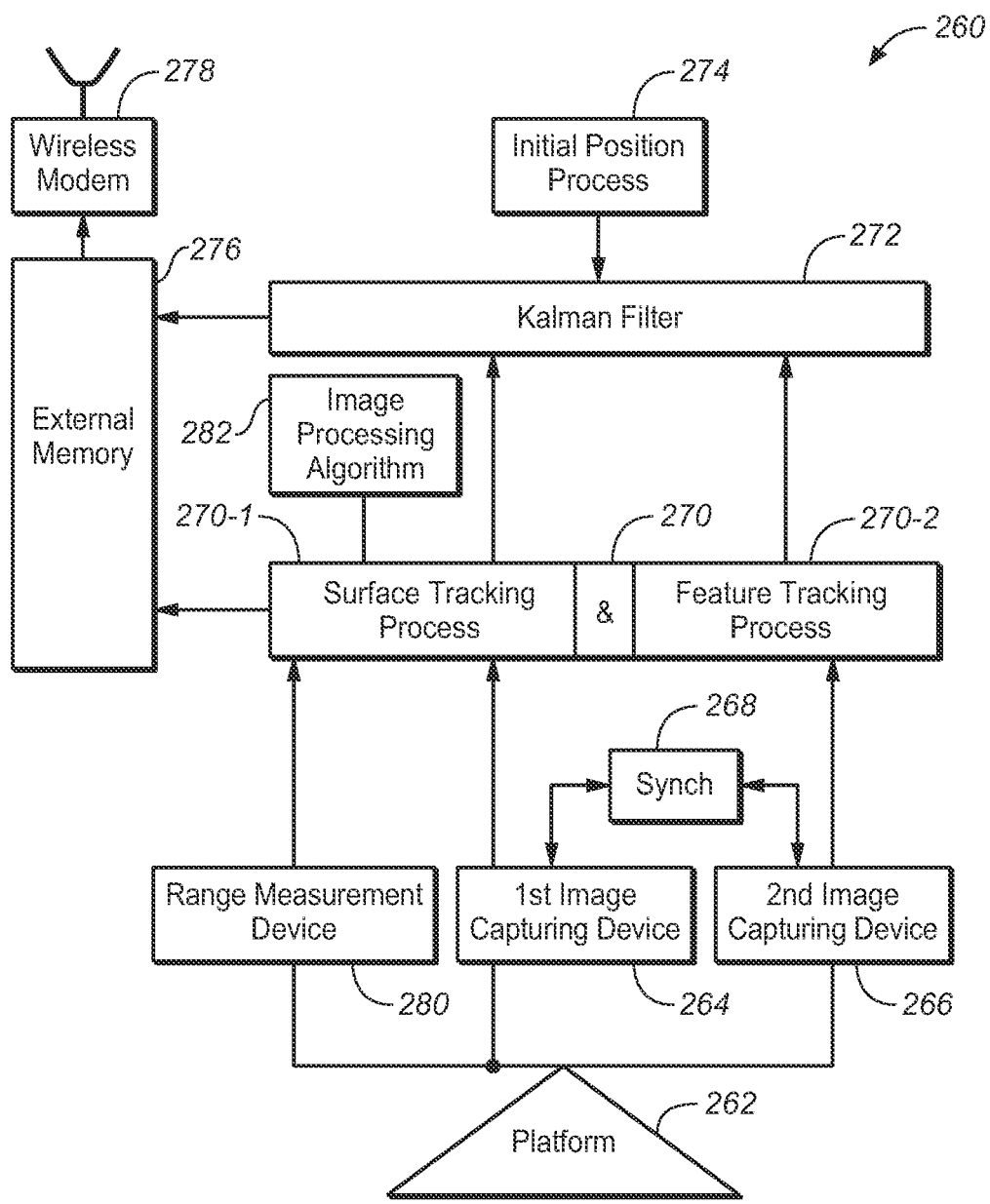
FIG. 9 illustrates an image-based positioning apparatus including the feature and surface tracking process for the purposes of the present technology.

V. Image-Based Positioning Apparatus Including Object & Surface Tracking Process In an embodiment of the present technology, FIG. 9 illustrates an image-based positioning apparatus 260 including the feature & surface tracking process 270. The process 270 can be implemented by using a general purpose processor, or by using an application specific processor (ASIC, FPGA, PLD, etc).

In an embodiment of the present technology, the process 270 comprises two sub-processes: a sub-process 270-1 configured to perform surface tracking processing (please, see discussion below), and a sub-process 270-2 configured to perform a feature-tracking processing (please, see discussion above).

In an embodiment of the present technology, the image-based positioning apparatus 210 further comprises two image-capturing devices 264 and 266 mounted on a platform 262. In an embodiment of the present technology, the fields of view of the two image capturing devices overlap. In an embodiment of the present technology, the fields of view of the two image capturing devices do not overlap.

In an embodiment of the present technology, the platform 262 comprises a rover.

In an embodiment of the present technology, the platform 262 comprises a rover RTK system.

In an embodiment of the present technology, the platform 262 comprises a GIS/Mapping handheld.

In an embodiment of the present technology, the first image-capturing device 264 is configured to capture a image of a surface at a first position of the platform 262.

In an embodiment of the present technology, the surface can be selected from a group consisting of: a ground surface; a top surface; a side surface; and a surface inclined at an arbitrary angle or the like.

In an embodiment of the present technology, the image-based positioning apparatus 260 further comprises a range-measurement device 280 configured to obtain a set of depth data of the selected surface.

In an embodiment of the present technology, the range measuring device 280 can be selected from a group consisting of: a point laser beam; a sonar; a radar; a laser scanner; and a depth camera or the like.

A point laser beam range measuring device 280 can be implemented by using a blue solid-state lasers, red diode lasers, IR lasers which maybe continuously illuminated lasers, or pulsed lasers, or sequenced lasers or a similar device.

A sonar range measuring device 280 can be implemented by using an active sonar including sound transmitter and a receiver.

A radar range measuring device 280 can be implemented by using a transmitter that emits either microwaves or radio waves that are reflected by the surface and detected by a receiver, typically in the same location as the transmitter.

A depth camera can be implemented by using a video camera that can capture video with depth information.

This camera has sensors that are able to measure the depth for each of the captured pixels using a principle called Time-Of-Flight. It gets 3D information by emitting pulses light, typically infra-red, to all objects in the scene and sensing the reflected light from the surface of each object. Depth is measured by computing the time-of-flight of a ray of light as it leaves the source and is reflected by the objects on the surface. The round trip time is converted to distance information using the well known speed of light.

Referring still to FIG. 9, in an embodiment of the present technology, the second image-capturing device 266 is configured to capture a image including at least one object at the first position and at a second position of the platform 262.

In an embodiment of the present technology, the image-based positioning apparatus 260 further comprises a synchronizing block 268 configured to synchronize the first image-capturing device 264 and the second image-capturing device 266.

In an embodiment of the present technology, the synchronizing block 266 is implemented by using a control signal generated by a controller.

In an embodiment of the present technology, the image-based positioning apparatus 260 further comprises a position process 274 which can be selected from the group consisting of: a GNSS process; an image-matched photogrammetric process; a georeferenced-image-based process; a SLAM process; a match move process; a surface track process; or similar device. The operations of a GNSS process; an image-matched photogrammetric process; a georeferenced-image-based process; a SLAM process; a match move process; a surface track process; were disclosed in details in the above-given discussions. The position process 274 is configured to obtain a position of the platform 262.

In an embodiment of the present technology, the surface tracking sub-process 270-1 is configured to process an image of the selected surface obtained by the first image-capturing device 264 at the first position of the platform 262.

The method and apparatus for surface tracking was disclosed in the patent application "IMAGE-BASED TRACKING", by Hongbo Teng, Gregory C. Best, and Sy Bor Wang, Ser. No. 12/459,843, that is incorporated herein in its entirety.

More specifically, referring still to FIG. 9, according to the US patent application "IMAGE-BASED TRACKING", the image capturing device 264 is configured to perform image-capture of the selected surface, and the range-measurement device 280 is configured to obtain a set of depth data on the selected surface. The tracking of the platform 262 is performed by using surface-tracking process 270-1 that is configured to analyze an image by using an image processing algorithm 282.

In an embodiment of the present technology, the image processing algorithm 282 assumes global rigid motion. By parameterizing the global optical flow with the image capturing device's 264 six degrees of freedom, an optimal global transformation between two consecutive frames can be found by solving a non-linear Least-Squares problem.

In an embodiment of the present technology, the image processing algorithm 282 matches the optical properties of the pixels by using a frame function.

In an embodiment of the present technology, with the depth information available, the image processing algorithm 282 matches the depth of the two frames (instead of optical properties of the pixels) by redefinition of frame function.

In an embodiment of the present technology, the image processing algorithm 282 can be improved by matching a combination of pixel optical properties and depth information. This can be done by either using a combined cost function, or aiding one process with the other, as fully disclosed below.

In an embodiment of the present technology, the image processing algorithm 282 utilizes several coordinate systems: a stationary reference system; a reference system attached to the image capturing device 264; and a 2D reference system on image capturing device's sensor plane.

In the stationary reference system a point on the surface has coordinates x=(x,y,z), the image capturing device 264 is described by 6-vector comprising device's position coordinates $x_{ci}=(x_{ci}, z_{ci})$ and device's orientation coordinates ($\psi_i$, $\theta_i,\phi_i$) (yaw, pitch and roll) for each $i^{th}$ frame.

In the reference system attached to the image capturing device 264 the same point on the surface has coordinates $x_i=(x_i, y_i, z_i)$ w.r.t. the image capturing device 264.

In the 2D reference system attached to the image capturing device's sensor plane 32 the 2D pixel coordinates of a point in the $i^{th}$ frame is: $u_i=(u_i,v_i)$.

The relation between the stationary 3D system and the image capturing device-attached 3D system is as follows:

$$x_i=(x-x_{ci})R_i, \quad (Eq. 11)$$

Where $$R_i = \begin{pmatrix} \cos(\psi_i) & -\sin(\psi_i) & 0 \\ \sin(\psi_i) & \cos(\psi_i) & 0 \\ 0 & 0 & 1 \end{pmatrix} \quad (Eq. 12)$$

$$\begin{pmatrix} \cos(\theta_i) & 0 & \sin(\theta_i) \\ 0 & 1 & 0 \\ -\sin(\theta_i) & 0 & \cos(\theta_i) \end{pmatrix} \begin{pmatrix} 1 & 0 & 0 \\ 0 & \cos(\varphi_i) & -\sin(\varphi_i) \\ 0 & \sin(\varphi_i) & \cos(\varphi_i) \end{pmatrix}$$

is the rotation matrix between two systems.

The relation between the image capturing device-attached 3D coordinates and the 2D pixel coordinates depends on the mapping function m of the image capturing device 264. The mapping function takes 3D coordinates $x_i$ in the image capturing device-attached system of the $i^{th}$ frame and maps into a 2D pixel coordinates in the $i^{th}$ frame:

$$u_i = m(x_i). \quad \text{(Eq. 13)}$$

The form of the mapping function depends on the type of the lenses. In an embodiment of the present technology, wherein the lenses comprise regular rectilinear lenses (in an inverted pin-hole model), the mapping function m can be derived from the following equations:

$$u_i = \frac{f}{S_u}\frac{x_i}{z_i} - u_0$$
$$v_i = \frac{f}{S_v}\frac{y_i}{z_i} - v_0; \quad \text{(Eq. 14)}$$

where f is the image capturing device 264 focal length, $S_u$, $S_v$ are the pixel width and height. $u_0$, $v_0$ are the offsets between the optical center and sensor center.

In another embodiment of the present technology, wherein the lenses 16 comprise orthographic fisheye lenses, the mapping function m can be derived from the following equations:

$$u_i = \frac{f}{S_u}\frac{x_i}{r} - u_0$$
$$v_i = \frac{f}{S_v}\frac{y_i}{r} - v_0; \quad \text{(Eq. 15)}$$

where r is the distance between the point and the optical center $$r = \sqrt{x_i^2 + y_i^2 + z_i^2}.$$

In an embodiment of the present technology, the mapping function m can be calibrated and stored in a numeric form.

To find out the reverse of the mapping function:

$$x_i = m^{-1}(u_i), \quad \text{(Eq. 16)}$$

one needs to know the depth of the object point.

In an embodiment of the present technology, the depth of a scene object point is obtained as a function of pixel location in each frame $z_i = z_i(u_i)$. These measurements are made in the image capturing device-attached 3D reference system.

The relation between two sequential frames $f_i$ and $f_j$ is built upon the assumption that the same point on the surface produces two pixels of the same intensity in two frames.

That is, if $u_i$ and $u_j$ are pixel locations in $f_i$ and $f_j$ of the same object point, then $f_i(u_i) = f_j(u_j)$. Here $f_i(u_i)$ refers to the pixel intensity at $u_i$ in frame $f_i$. Under this assumption the relation between two frames is purely a geometrical transformation resulting from the image capturing device's motion.

The image capturing device motion from $f_i$ to $f_j$ can be represented by $\delta x_{ci \to j}$ and $\delta R_{i \to j}$ which is the relative shift and rotation between frames, or, $\xi_{i \to j} = (\delta x_{ci \to j}, \delta y_{ci \to j}, \delta z_{ci \to j}, \delta\psi_{i \to j}, \delta\theta_{i \to j}, \delta\phi_{i \to j})$, which is a 6-vector having the six degrees of freedom. If the image capturing device position and attitude at frame $f_i$ is known, then solving this relative motion from $f_i$ to $f_j$ gives us the position and attitude at frame $f_j$. In the following the subscript $i \to j$ is dropped whenever possible.

The same object point which has coordinates $x_i$ in frame $f_i$'s reference system has coordinates $x_j$ in frame $f_j$'s reference system, and:

$$x_j = (x_i - \delta x_c)\delta R. \quad \text{(Eq. 17)}$$

Therefore in the 2D pixel coordinate systems, the relation between $u_i$ and $u_j$ as follows:

$$u_i \xrightarrow{m^{-1}} x_i \xrightarrow{\xi} x_j \xrightarrow{m} u_j, \quad \text{(Eq. 18)}$$

where m is the mapping function. Or simply $$u_j = \delta P(u_i), \quad \text{(Eq. 19)}$$

where $\delta P = m \diamond \xi \diamond m^{-1}$ represents the combination of three operations.

The task now is to find out the optimal 4 so that the cost function $$\int |f_i(u) - f_j(\delta P(u))|^2 du \quad \text{(Eq. 20)}$$

is minimized. This is a well-researched nonlinear least-squares problem. Solving it usually involves linear approximation and iteration. Different linear approximations give rise to different convergence methods, such as Gauss-Newton, steepest-descent, Levenberg-Marquar descent, etc.

In an embodiment of the present technology, referring still to FIG. 9, the second image-capturing device 266 is configured to capture a image including at least one object at the first position and at a second position of the platform 262.

In an embodiment of the present technology, the feature-tracking sub-process 270-2 is configured to process each image obtained by the second image-capturing device 266 at the first and at the second position of the platform 262 and configured to extract a set of tracking data for at least one captured object.

In an embodiment of the present technology, referring still to FIG. 9, the feature-tracking sub-process 270-2 is also configured to determine the location of the position of the platform 262 by using the set of tracking data obtained for at least one captured object.

In an embodiment of the present technology, referring still to FIG. 9, the image-based positioning apparatus 260 further comprises a Kalman filter 272. Kalman filter 272 is configured to obtain a Kalman-estimate of the position of the platform 262 by combining the surface-tracking-based coordinates of the second position of the platform 262 as a first noisy measurement and the feature-based coordinates of the second position of the platform 262 as a second noisy measurement.

In an embodiment of the present technology, the image-based positioning apparatus 260 further comprises an external memory block 276 configured to store at least one surface tracking and feature-based three-dimensional (3D) position coordinates of the platform 262 for further processing.

In an embodiment of the present technology, the image-based positioning apparatus 260 further comprises a wireless modem 278 configured to provide a remote Internet access to the external memory block 276.

VI. Operation of Image-Based Positioning Apparatus Including Object & Surface Tracking Process.

In an embodiment of the present technology, referring still to FIG. 9, the operation of the Image-Based Positioning apparatus 260 including feature- & surface tracking process 270 comprises the following steps.

An image of a selected surface is captured by using the first image-capturing device 264 at the first position of the platform 262. A set of depth data of the selected surface is calculated by using the range-measurement device 280. A rigid global transformation of the set of captured image data and the set of the selected surface depth data into a set of 6-coordinate data is performed by using the image-processing algorithm 282; wherein the set of 6-coordinate data represents movement of the platform 262. The set of 6-coordinate data is processed by using the image-processing algorithm 282 to obtain a location of the position of the platform 262.

In an embodiment of the present technology, referring still to FIG. 9, the operation of the Image-Based Positioning apparatus 260 including feature- & surface tracking process 270 further comprises the following steps.

A first image is captured by using the second image-capturing device 266 at the first position of the platform 262; wherein the first image includes at least one object. A second image is captured by using the second image-capturing device 266 at the second position of platform 262; wherein the second image includes at least one captured object.

The first image and the second image are processed to track a location of at least one captured object; wherein a set of two-dimensional position fixes for at least one captured object is obtained from processing the first image and the second image, providing a set of tracking data for the captured object. Please see Equations (1-7).

The location of the second position of the platform 262 is determined by using the set of tracking data of at least one captured object. Please see Equations (1-7).

Finally, the position of the platform 262 are determined by combining the surface-tracking-based coordinates of the position of the platform 262 and the feature-based coordinates of the position of the platform 262.

In an embodiment of the present technology, referring still to FIG. 9, the Kalman filter 272 is used to obtain a Kalman-estimate of the position of the platform 262 by combining the surface-tracking-based coordinates of the position of the platform 262 as a first noisy measurement and the feature-based coordinates of the position of the platform 262 as a second noisy measurement.

In an embodiment of the present technology as an alternative to combining two location estimates to come up with an improved location estimate for the platform, the raw object tracking data and the raw surface tracking data may be combined in a common estimator, and a single estimate of the platform location may be obtained. The method includes using elements from any of the estimation methods such as SLAM, MoveMatch, Surface Tracking, or photogrammetry. A Kalman filter may be employed to do the estimation, in the same way as a least squares solution may be employed.

The above discussion has set forth the operation of various exemplary systems and devices, as well as various embodiments pertaining to exemplary methods of operating such systems and devices. In various embodiments, one or more steps of a method of implementation are carried out by a process under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An image-based method for tracking the location of a platform containing at least one image capturing device and at least one range measuring device comprising:
    capturing a first image with said at least one image capturing device; wherein said first image includes at least one object and at least one surface;
    obtaining a first set of depth data of said at least one surface in said first image using said at least one range measuring device; thereafter
    moving said platform and capturing a second image with said at least one image capturing device; wherein said second image includes said at least one object and said at least one surface;
    obtaining a second set of depth data of said at least one surface in said second image using said at least one range measuring device;
    processing said plurality of images of said at least one object and said at least one surface using a combined feature based process and surface tracking process, wherein said feature based process is different from said surface tracking process and includes matching optical properties of pixels, and said surface tracking process includes matching said first set of depth data and said second set of depth data; and
    determining the location of said platform from the combined feature based process and surface tracking process.

2. The method of claim 1, wherein said feature based process is based upon the Simultaneous Location and Mapping (SLAM) tracking process.

3. The method of claim 1, wherein said feature based process is based upon the Match Move tracking process.

4. The method of claim 1, wherein said feature based process is based upon the photogrammetric tracking process.

5. The method of claim 1, wherein said at least one object is captured in said first image and in said second image by a first image capturing device and said at least one surface is captured in said first image and in said second image by a second imaging capturing device.

6. The method of claim 5, further comprising:
synchronizing said first image capturing device and said second image capturing device.

7. The method of claim 1, further comprising:
a GNSS receiver on said platform outputting a location for said platform; and
determining the location of the platform by combining the location output by the combined feature based process and surface tracking process with the location output by said GNSS receiver.

8. The method of claim 1 further comprising:
accessing georeferenced data correlated to said at least one object; and
determining the location of said platform based upon said georeferenced data for said at least one object.

9. An image-based method for tracking the location of a platform containing at least one image capturing device and at least one range measuring device comprising:
capturing a first image with said at least one image capturing device; wherein said first image includes at least one object and at least one surface;
obtaining a first set of depth data of said at least one surface in said first image using said at least one range measuring device; thereafter
moving said platform and capturing a second image with said at least one image capturing device; wherein said second image includes said at least one object and said at least one surface;
obtaining a second set of depth data of said at least one surface in said second image using said at least one range measuring device;
processing said plurality of images to track the location of said at least one object using a feature based process that includes matching optical properties of pixels;
outputting first coordinates for said platform based upon said feature based process;
processing said plurality of images to track the location of said at least one surface using a surface tracking process that includes matching said first set of depth data and said second set of depth data;
outputting second coordinates for said platform based upon said surface tracking process; and
determining the location of said platform by processing said first coordinates output by said feature based process and said second coordinates output by said surface based process.

10. The method of claim 9, wherein said feature based process is based upon the Simultaneous Location and Mapping (SLAM) tracking process.

11. The method of claim 9, wherein said feature based process is based upon the Match Move tracking process.

12. The method of claim 9, wherein said feature based process is based upon the photogrammetric tracking process.

13. The method of claim 9, wherein said at least one object is captured in said first image and in said second image by a first image capturing device and said at least one surface is captured in said first image and in said second image by a second imaging capturing device.

14. The method of claim 13, further comprising:
synchronizing said first image capturing device and said second image capturing device.

15. The method of claim 9, further comprising:
a GNSS receiver on said platform outputting a location for said platform; and
determining the location of the platform by combining the locations output by said feature based process, said surface based process and said GNSS receiver.

16. The method of claim 9 further comprising:
accessing georeferenced data correlated to said at least one object; and
determining the location of said platform based upon said georeferenced data for said at least one object.

17. An image-based method to estimate a location of a platform containing an image capturing device and a GNSS receiver comprising:
determining the location of the platform using a GNSS receiver;
capturing at least one image at a first position of said image capturing device;
wherein said first image includes at least one object; capturing at least one image at a second position of said image capturing device; wherein said second image includes said at least one object;
processing said plurality of images to track a location of said at least one captured object; wherein a set of two-dimensional position fixes for said at least one captured object is obtained from processing said plurality of images, providing a set of tracking data for said at least one object; determining the location of said image capturing device by using said set of tracking data of said at least one object;
and
calculating a new location of said platform by combining the location of said image capturing device with the location determined by said GNSS receiver.

18. The method of claim 17, further comprising:
using an inverse projection function applied to said set of tracking data of said at least one captured object to solve for a set of three-dimensional (3D) coordinates of said position of said image capturing device.

19. The method of claim 17, further comprising:
obtaining a set of two-dimensional (2D) tracking data for at least three features, wherein said set of two-dimensional (2D) tracking data for said at least three features is used to determine three-dimensional (3D) position coordinates of said image capturing device by using a triangulation method.

20. The method of claim 17 wherein said platform is selected from the group consisting of:
a GNSS rover; a GNSS rover RTK system; and a GIS/Mapping handheld.

21. The method of claim 17 further comprising:
a second image capturing device on said platform;
capturing at least one image at the first position with said second image capturing device; wherein said first image includes at least one second object;
capturing at least one image at a second position with said second image capturing device; wherein said second image includes said at least one second object;
processing said plurality of images to track a location of said at least one second object; wherein a set of two-dimensional position fixes for said at least one second object is obtained from processing said plurality of images, providing a set of tracking data for said at least one second object; determining the location of said second image capturing device by using said set of tracking data of said at least one second object;
and
calculating a new location of said platform by combining the location of said second image capturing device with the location of said image capturing device and the location determined by said GNSS receiver.

22. The method of claim 21 further comprising:
determining weighted feature based coordinates of said location of said platform.

23. The method of claim 22, further comprising:
assigning a first weight to a set of tracking data of said at least one first object;
assigning a second weight to a set of tracking data of said at least one second object;
and
determining feature based coordinates of said location of said platform by using said set of weighted tracking data of said at least one first object and said set of weighted tracking data of said at least one second object.

24. The method of claim 21 further comprising:
using a Kalman filter to obtain a Kalman estimate of said second position of said platform by combining said set of tracking data of said at least one first object as a first measurement and said set of tracking data of said at least one second object as a second measurement.

25. An image based positioning apparatus comprising:
an image capturing device configured to capture a first image including at least one feature and a surface; said image capturing device configured to capture a second image including said at least one feature and said surface;
a range measuring device configured to obtain a first set of depth data of said surface in said first image; said range measuring device configured to obtain a second set of depth data of said surface in said second image;
and
a processor configured to process each of said images; wherein said processor is configured to determine the location of said platform by using a combined feature based process and surface tracking process, wherein said feature based process is different from said surface tracking process and includes matching optical properties of pixels, and said surface tracking process includes matching said first set of depth data and said second set of depth data.

26. An image based positioning apparatus comprising:
at least two image capturing devices;
each said image capturing device mounted on a platform; said first image capturing device configured to capture an image including at least one feature; said first image capturing device configured to capture a second image including at least one feature; said second image capturing device configured to capture an image including a surface; said second image capturing device configured to capture a second image including said surface;
a range measuring device configured to obtain a set of depth data of said surface in said image; said range measuring device configured to obtain a second set of depth data of said surface in said second image;
and
a processor configured to process each of said images; wherein said processor is configured to determine the location of said platform by using a combined feature based process and surface tracking process, wherein said feature based process is different from said surface tracking process and includes matching optical properties of pixels, and said surface tracking process includes matching said first set of depth data and said second set of depth data.

27. The method of claim 1, wherein said range measuring device is selected from the group consisting of:
a point laser beam; a sonar; a radar; a laser scanner; and a depth camera.

28. The method of claim 9, wherein said range measuring device is selected from the group consisting of:
a point laser beam; a sonar; a radar; a laser scanner; and a depth camera.

29. The method of claim 25, wherein said range measuring device is selected from the group consisting of:
a point laser beam; a sonar; a radar; a laser scanner; and a depth camera.

30. The method of claim 26, wherein said range measuring device is selected from the group consisting of:
a point laser beam; a sonar; a radar; a laser scanner; and a depth camera.

* * * * *